Oct. 18, 1955     H. SHAMES     2,721,089
EXPANSION TYPE ADAPTER FOR USE WITH A CONDUIT
ADAPTED TO DELIVER FLUID UNDER PRESSURE
Filed May 31, 1952
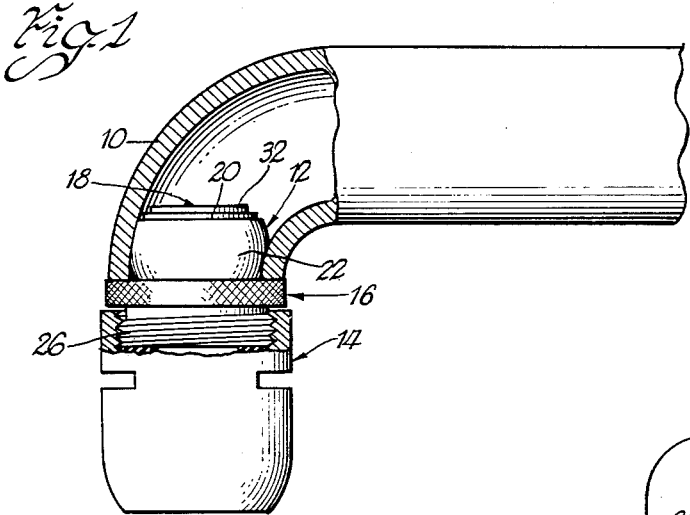
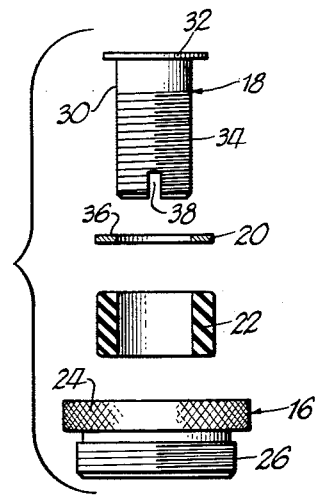
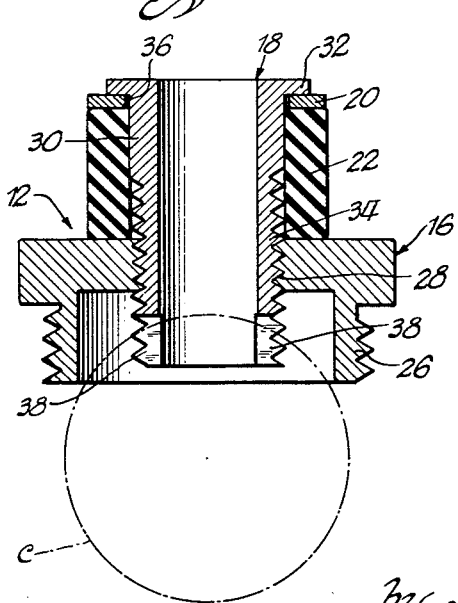
Inventor
Harold Shames
by Bair, Freeman & Molinare
Attys.

United States Patent Office 2,721,089
Patented Oct. 18, 1955

2,721,089

EXPANSION TYPE ADAPTER FOR USE WITH A CONDUIT ADAPTED TO DELIVER FLUID UNDER PRESSURE

Harold Shames, Bronx, N. Y.

Application May 31, 1952, Serial No. 290,883

4 Claims. (Cl. 285—90)

This invention relates to an adapter for securing assemblies, such as aerators, and the like, to the discharge end of a spout through which liquid is supplied, and more particularly to an adapter for a kitchen faucet spout and the like.

While many spout adapers have been constructed for frictional retention on kitchen faucets, many are adapted to grasp the outside of the faucet. These adapters are usually bulky and unsightly and many housewives refuse to use them because of their unaesthetic appearance.

Because of inadequate frictional force applied in retaining an adapter on a spout, there is usually undesirable seepage of fluid, and many times when the housewife is using the faucet, the force of the fluid ejects the adapter from the faucet with tremendous force and velocity often causing damage to the object in the sink or the sink itself, not to speak of the accompanying fright imposed upon the housewife with the thereafter residual psychological fear and distrust in the use of similar articles.

Thus one of the objects of this invention is to provide a spout adapter which is secured in position by clamping a grasping member into frictional engagement with the inside of a spout with unusually large force.

Another object of this invention is to provide a spout adapter for kitchen faucets and the like which adapter may be secured to the faucet with unusually large force without the necessity of employing other than basic tools which are normally found around kitchens and which housewives are ordinarily accustomed to using.

A further object of this invention is to provide a spout adapter for kitchen faucets and the like which adapter is characterized by its simplicity and inexpensiveness of construction, and by its neat appearance when attached to the faucet spout.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a view partially in cross-section showing my adapter positioned in the open end of a spout and having an aerator secured thereto.

Figure 2 is an exploded view of the parts of my adapter.

Figure 3 is a greatly enlarged cross-section view of the assembled adapter.

Referring now to the drawings, I have shown in Figure 1 a faucet spout 10 within which is positioned an adapter generally indicated by numeral 12 and to which adapter is secured an apparatus, such as an aerator, generally indicated at 14. As shown in Figure 2, the adapter 12 includes a plate member 16, a ferrule 18, washer 20, and resilient sleeve, or annular deformable member, 22.

The plate 16 has a knurled edge 24 and a tubular threaded stub, or annular exteriorly threaded attaching means, 26 extending from one side thereof, said threaded stub providing means for securing an assembly, such as aerator 14, to the plate 16. The plate 16 is centrally bored and threaded as at 28.

The ferrule 18 includes a tubular portion 30 and an integral flange 32 at one end thereof. The tubular portion 30 is threaded at 34 to afford operative connection with the threaded bore 28 in the plate 16.

The washer 20 has a central bore 36 of slightly larger dimension than the diameter of the tubular ferrule portion 30. The washer 20 is adapted to be loosely fitted over the tubular portion 30 of the ferrule, and to engage the flange 32. The washer 20 may be of varying outer diameter depending upon the size of the outer diameter of resilient sleeve 22.

The lower end of ferrule 18 is slotted diametrically at 38 to define a pair of slots in said ferrule, as shown in the drawings, which lie in a plane through the longitudinal axis of said ferrule. The size of the socket or slot 38 is such that a one-cent piece, or the like, or the end of a screw driver may be inserted therein for the purpose of rotating the ferrule when the ferrule is in the assembled position shown in Figure 3. The slot 38 serves as a non-circular socket for receiving a mating key or wrench, which as pointed out above, may, for example, be the edge of a coin or a bit of a screw driver. In Figure 3, there is shown in dot-dash lines, and generally indicated at C, the outline of a one-cent piece, as it would appear when inserted in the socket or slot 38 to be used for the purpose of applying axially compressive force on the resilient sleeve 22 so as to expand the resilient sleeve 22 into frictional and positive clamping engagement with the inner walls of the spout.

The washer 20 is generally of greater diameter than the ferrule flange 32 and serves a two-fold purpose. First, the washer 20 serves to distribute the axial compressive force equally over the entire area of the end of the resilient sleeve 22 with which the washer 20 is in contact. The distribution of compressive force over the entire end area of the resilient sleeve brings about increased and more uniform expansion of the sleeve.

Second, the washer 20 serves as a friction reducing bearing plate between ferrule flange 32 and resilient sleeve 22. If the ferrule flange 32 were in direct contact with the sleeve 22, the frictional force therebetween would result in some twisting of the sleeve 22 as the ferrule was rotated during the process of expanding the sleeve 22. The coefficient of friction between washer 20 and ferrule flange 32 is very much less than between flange 32 and resilient sleeve 22 and, consequently, there is no twisting of resilient sleeve 22 when the ferrule is rotated during the process of expanding the resilient sleeve 22.

In assembling the adapter in the spout, the plate 16, ferrule 18, washer 20, and resilient sleeve 22, are pre-assembled as shown in Figure 3, and then the ferrule, washer, and resilient sleeve are inserted into the discharge end of a faucet spout. Then, by grasping the knurled edge of plate 16 with one hand and inserting a one-cent piece, or other coin, or screw driver, or any other appropriate key or wrench, into the socket 38 in ferrule 18 with the other hand and twisting in a counterclockwise direction, one is able to quickly and effectively apply a large positive compressive force on the resilient sleeve so as to expand the resilient sleeve 22 into frictional and clamping engagement with the inner walls of the spout. The resilient sleeve 22 serves not only to frictionally and clampingly retain the adapter in position on the spout, but also serves as a seal between the spout 10 and the plate 16, to prevent seepage of fluid therebetween.

As shown in Figure 1, the diameter of plate 16 is at least as great as the outer diameter of the faucet spout 10. This feature permits better gripping of the knurled edge 24 of plate 16 when the adapter is being secured to the spout.

The ferrule permits the use of tools to simultaneously and directly grasp, in driving relation, both the plate 16 and ferrule 18. By reason of this feature, initial frictional engagement of the resilient sleeve with the inner wall of the spout is unnecessary in mounting the adapter on a spout, whereas heretofore such initial frictional engagement was necessary.

The large clamping forces which may be applied between the resilient sleeve and the spout by the use of the slotted ferrule eliminate the necessity of using relatively long resilient sleeves for the purpose of providing sufficient contact area to achieve the frictional engagement necessary to retain the adapter in position under the range of fluid flow forces available. As such, this adapter may be made much shorter than any adapter heretofore made. And the smaller length of adapter permits its installation in extremely short spouts and in spouts having extreme curvature at the discharge end thereof.

As best shown in Figure 3, the arrangement of parts hereinabove described provides that both the plate 16 and the slotted end of ferrule 18 are positionable outside the terminal end of the faucet, or conduit, 10, whereby both said plate 16 and ferrule 18 may be engaged and grasped during the operation of the adapter, from outside said faucet, or conduit, 10. As further clearly shown in Figure 3, the annular exteriorly threaded attaching means, or tubular threaded stub, 26 extends from plate 16 in the same direction that said slotted end of the ferrule 18 is spaced from plate 16. Also, as shown in Figure 3, the extended terminus of said attaching means 26 is spaced further from plate 16 than is the terminus of the slotted end of ferrule 18, thereby affording for securement of an object, such as aerator 14, to said attaching means 26 without interference between said aerator 14 and the ferrule 18.

Thus, it can be seen that I have provided an improved adapter for faucet spouts and the like, which adapter may be secured to the faucet with unusually large force without the necessity of employing other than ordinary tools which are normally found around kitchens and which housewives are ordinarily accustomed to using.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An adapter for use with a conduit adapted to deliver fluid under pressure, said adapter comprising an annular deformable member initially of smaller external dimension than the internal dimension of sid coduit and adapted to be deformed by application of axial forces to the ends thereof, said deformable member adapted to be inserted into said conduit, an elongated ferrule extending through said deformable member and terminating at one end in an annular flange of a smaller dimension than the inner dimension of said conduit, the other terminal end of said ferrule being slotted diametrically to define a pair of slots therein lying in a plane through the longitudinal axis of said ferrule, a washer on said ferrule positioned between said annular flange and one end of said deformable member, said outer dimension of said washer being of smaller dimension than the inner dimension of said conduit, a portion of said ferrule between said slots and said annular flange being threaded, and a plate of a dimension greater than the inner dimension of said conduit having a threaded bore therethrough and with said ferrule threaded in said bore, said plate adapted to be grasped by its edge to restrain it against rotation, the slots in said ferrule providing for entrance of a tool therein to engage the ferrule and by means of which a direct force may be applied to the ferrule so that the ferrule may be rotated relative to the plate to advance the annular flange toward the plate to apply axial forces to the deformable member, whereby the deformable member is expanded into clamping engagement with the inner wall of the conduit to secure the adapter to said conduit, said arrangement of plate and ferrule providing that both said plate and the slotted end of the ferrule are positionable outside the terminal end of the conduit, whereby both may be engaged and grasped, during the operation of said adapter, from outside said conduit.

2. An adapter for use with a conduit adapted to deliver fluid under pressure, said adapter comprising an annular deformable member initially of smaller external dimension than the internal dimension of said conduit and adapted to be deformed by application of axial forces to the ends thereof, said deformable member adapted to be inserted into said conduit, an elongated ferrule extending through said deformable member and terminating at one end in an annular flange of a smaller dimension than the inner dimension of said conduit, the other terminal end of said ferrule being slotted diametrically to define a pair of slots therein lying in a plane through the longitudinal axis of said ferrule, a washer on said ferrule positioned between said annular flange and one end of said deformable member, said outer dimension of said washer being of smaller dimension than the inner dimension of said conduit, a portion of said ferrule between said slots and said annular flange being threaded, and a plate of a dimension greater than the inner dimension of said conduit having a threaded bore therethrough and with said ferrule threaded in said bore, said ferrule extending through said plate and having its terminal ends spaced from said plate, said plate adapted to be grasped by its edge to restrain it against rotation, the slots in said ferrule providing for entrance of a tool therein to engage the ferrule and by means of which a direct force may be applied to the ferrule so that the ferrule may be rotated relative to the plate to advance the annular flange toward the plate to apply axial forces to the deformable member, whereby the deformable member is expanded into clamping engagement with the inner wall of the conduit to secure the adapter to said conduit, said arrangement of plate and ferrule providing that both said plate and the slotted end of the ferrule are positionable outside the terminal end of the conduit, whereby both may be engaged and grasped, during the operation of said adapter, from outside said conduit, and said plate having an annular exteriorly threaded attaching means thereon extending therefrom in the same general direction that said slotted end of the ferrule is spaced from said plate, said attaching means being of such length that the terminus of said attaching means is spaced further from said plate than is the terminus of said slotted end of the ferrule, thereby affording for the securement of an object to said attaching means without interference between said object and said ferrule.

3. In an adapter of the type which is to be secured to an open end of a conduit adapted to deliver fluid under pressure, which adapter includes a deformable tubular member, initially of smaller dimension than the inside dimension of the conduit and adapted to be inserted into the conduit, and force applying means carrying said deformable tubular member and operative to apply axial forces to opposite ends of the deformable member to cause it to expand circumferentially into frictional gripping engagement with the inner wall of the conduit; the improvement in said force applying means of a plate of greater dimension than the inner dimension of the conduit, said plate having a threaded bore therethrough, the edge of the plate affording means for grasping said plate, a threaded ferrule in said bore terminating at one end in an annular flange of a smaller dimension than the inner dimension of said conduit, a washer on said ferrule in engagement with said flange and of a smaller dimension than the inner dimension of said conduit, the portion of said ferrule between said washer and said plate adapted to have said deformable tubular member mounted thereon, and the other end of said ferrule having a non-circular socket formed therein adapted to be engaged by a non-circular key for rotating said ferrule relative to said plate, said arrangement of plate and ferrule providing that both said plate and the socketed end of the ferrule are positionable outside the terminal end of the conduit, whereby both may be engaged and grasped, during the operation of said adapter, from outside said conduit.

4. In an adapter of the type which is to be secured to an open end of a conduit adapted to deliver fluid under pressure, which adapter includes a deformable tubular member, initially of smaller dimension than the inside dimension of the conduit and adapted to be inserted into the conduit, and force applying means carrying said deformable tubular member and operative to apply axial forces to opposite ends of the deformable member to cause it to expand circumferentially into frictional gripping engagement with the inner wall of the conduit; the improvement in said force applying means of a plate of greater dimension than the inner dimension of the conduit, said plate having a threaded bore therethrough, the edge of the plate affording means for grasping said plate, a threaded ferrule in said bore extending through said plate and having its terminal ends spaced from said plate, said ferrule terminating at one end in an annular flange of a smaller dimension than the inner dimension of said conduit, a washer on said ferrule in engagement with said flange and of a smaller dimension than the inner dimension of said conduit, the portion of said ferrule between said washer and said plate adapted to have said deformable tubular member mounted thereon, the other terminal end of said ferrule having a non-circular socket formed therein adapted to be engaged by a non-circular key for rotating said ferrule relative to said plate, said arrangement of plate and ferrule providing that both said plate and the socketed end of the ferrule are positionable outside the terminal end of the conduit, whereby both may be engaged and grasped, during the operation of said adapter, from outside said conduit, and said plate having annular attaching means thereon extending therefrom in the same general direction that said socketed end of the ferrule is spaced from said plate, said attaching means being of such length that the terminus of said attaching means is spaced further from said plate than is the terminus of said socketed end of the ferrule, thereby affording for the securement of an object to said attaching means without interference between said object and said ferrule.

References Cited in the file of this patent

UNITED STATES PATENTS

| | | |
|---|---|---|
| 2,075,714 | Hamill | Mar. 30, 1937 |
| 2,277,885 | Rodanet | Mar. 31, 1942 |
| 2,343,774 | Klein | Mar. 7, 1944 |
| 2,398,043 | Sarafin | Apr. 9, 1946 |
| 2,508,827 | Holden | May 23, 1950 |
| 2,543,954 | Barber | Mar. 6, 1951 |